United States Patent
Lapicki et al.

(10) Patent No.: US 11,404,083 B1
(45) Date of Patent: Aug. 2, 2022

(54) LASER STRESS MITIGATION FOR HEAT-ASSISTED MAGNETIC RECORDING

(71) Applicant: Seagate Technology LLC, Fremont, CA (US)

(72) Inventors: Adam Andrzej Lapicki, Londonderry (GB); Vijayaharan Arumungakannunadar Venugopal, Londonderry (GB); Helene Parwana Habibi, Londonderry (GB); Debra Ann McNeill, Londonderry (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/241,664

(22) Filed: Apr. 27, 2021

(51) Int. Cl.
*G11B 5/127* (2006.01)
*G11B 5/39* (2006.01)
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
CPC ..... G11B 5/1272; G11B 5/1278; G11B 5/187; G11B 5/2651; G11B 5/295; G11B 5/3116; G11B 5/3163; G11B 5/3929; G11B 5/3945; G11B 5/2567; G01B 7/30; G01R 33/02; G01R 33/09; G01R 33/098; B82Y 10/00; B82Y 25/00
USPC .................................................. 360/313, 324
See application file for complete search history.

(56) References Cited

U.S. PATENT DOCUMENTS

| | | | |
|---|---|---|---|
| 7,864,825 B2 | 1/2011 | Thiagarajan et al. | |
| 9,019,661 B2 | 4/2015 | Rea et al. | |
| 9,799,359 B1 | 10/2017 | Olson et al. | |
| 2010/0091414 A1* | 4/2010 | Yuasa | H01F 10/3259 427/535 |

OTHER PUBLICATIONS

Scholz, "Thermal and Mechanical Optimisation of Diode Laser Bar Packaging", Dissertation, May 23, 2007, 132 pages.
Thomas, "Plasma Processes for High vol. Manufacturing of VCSELs", Novus Light Today, Jan. 27, 2020, 4 pages.
Wang et al., "Study of the Mechanism of "Smile" in High Power Diode Laser Arrays and Strategies in Improving Near-field Linearity", 2009 Electronic Components and Technology Conference IEEE, 2009, pp. 837-842.

* cited by examiner

*Primary Examiner* — Nabil Z Hindi
(74) *Attorney, Agent, or Firm* — Mueting Raasch Group

(57) ABSTRACT

An apparatus has a substrate. A laser is deposited above the substrate. The laser comprises one or more non-self-supporting layers of crystalline material. A first layer is disposed proximate the laser. The first layer is deposited using a first process. A second layer is disposed proximate the second layer. The second layer is deposited using a second process different than the first process. The first layer and the second layer are configured to mitigate mechanical stress in the laser. A waveguide is deposited proximate the laser. The waveguide is configured to receive plasmons from the laser and direct the plasmons to a recording medium.

20 Claims, 4 Drawing Sheets

LASER STRESS MITIGATION FOR HEAT-ASSISTED MAGNETIC RECORDING

SUMMARY

Embodiments described herein involve an apparatus comprising a substrate. A laser is deposited above the substrate. The laser comprises one or more non-self-supporting layers of crystalline material. A first layer is disposed proximate the laser. The first layer is deposited using a first process. A second layer is disposed proximate the second layer. The second layer is deposited using a second process different than the first process. The first layer and the second layer are configured to mitigate mechanical stress in the laser. A waveguide is deposited proximate the laser. The waveguide is configured to receive plasmons from the laser and direct the plasmons to a recording medium.

Embodiments involve an apparatus comprising a substrate. A laser is deposited above the substrate. The laser comprises one or more non-self-supporting layers of crystalline material. A first layer is disposed proximate the laser. The first layer is deposited using a first process. A second layer is disposed proximate the second layer. The second layer is deposited using a second process different than the first process. The first layer and the second layer are configured to encapsulate a majority of an upper surface of the laser and to mitigate mechanical stress in the laser. A waveguide is deposited proximate the laser. The waveguide is configured to receive plasmons from the laser and direct the plasmons to a recording medium.

BRIEF DESCRIPTION OF THE DRAWINGS

Throughout the specification, reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
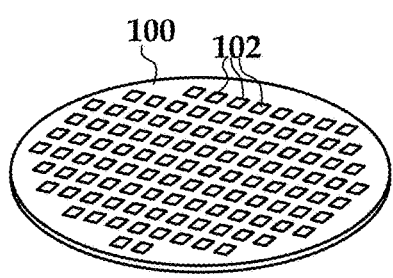
FIGS. 1-5 are diagrams showing a transfer printing process in accordance with embodiments described herein.

This disclosure relates to read/write heads used in heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," and "head" will be used interchangeably. In a HAMR device, a read/write head includes an energy source (e.g., a laser diode) that heats a recording medium during writing. The HAMR read/write head generally includes some form of optical transmission path, such as a waveguide and near-field transducer, that shapes and directs the energy from the energy source to the recording medium.

In some implementations, the read/write head and laser diode are formed using separate processes, aligned using a surface-mount placement process (e.g., pick and place), and bonded together (e.g., using solder). While this type of assembly process is well-established for assembly of electronic components, there are challenges in mass-assembly of HAMR read/write heads using these processes.

According to embodiments described herein, the space on a slider is very limited. When adding printed structures such as lasers and/or reader amplifier on the slider, heat sinking may be performed to sink heat away from the slider components. In general, the laser and/or other slider structures are fabricated on a heat sink disposed on a portion of a surface of the substrate of the slider. The heat sink may have one or more layers of highly thermally conductive materials configured to conduct heat away from the laser diode and/or other structures and use the substrate as a heat sink. In some cases, the heat sink may provide bonding for various transfer printed structures in the recording head. Properties of heat sink layer and/or layers adjacent to the laser diode may be chosen to match a coefficient of thermal expansion and/or other property of the laser diode to facilitate bonding of the laser diode and/or other slider structures to the substrate. The substrate may comprise a material (e.g., AlTiC) with a limited thermal conductivity. For example, the thermal conductivity of the substrate may be about 20 W/m·K.

In the present disclosure, hard drive recording heads are used onto which at least part of a semiconductor laser (e.g., crystalline, epitaxial layer) is not self-supporting (e.g., not a separately packaged device) but is physically carried by same substrate that carries the other components of the read/write head (e.g., write coil and poles, reader stack) without the use of a separate or intermediate support during attachment. Carrying the semiconductor laser with the read/write head substrate, without a separate or intermediate support substrate, can help to reduce the size and weight of the head, and it can also allow for the use of laser geometries and designs that are very different from simple edge-emitting cleaved facet lasers that have been proposed in the past. A thermally conductive underlayer may be provided that is configured to reduce the temperature of the laser diode and various surrounding structures. The underlayer may also be used to provide good thermal coupling between the laser diode and the substrate and other surrounding components of the hard drive recording head.

In at least some cases, parts of the laser (e.g., GaAs active region) are incompatible with epitaxial growth on the substrate. As such, the laser cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the slider-integral laser.

This process of transferring non-self-supporting layers of epitaxial-growth-incompatible layers is referred to herein as On-Wafer Laser (OWL) process integration. This process may also be referred to as transfer printing, dry transfer printing, nanoprinting, etc. In FIGS. 1-5, block diagrams illustrate transfer printing of components onto a recording head according to an example embodiment.

In FIG. 1, a donor substrate 100 includes a number of components 102 (e.g., epitaxial layers) formed using a first process (e.g., crystalline growth). The components 102 may include one or more layers of materials that have been processed via photolithography and/or other processes to attain a final shape and position on the substrate 100. A sacrificial layer may also be included between the components 102 and the substrate 100 to allow separation. This fabrication could include some or all of the following: epitaxial material layer, adhesion or protection layers, carrier layers (to increase thickness for easier transport), bonding layers to aid in best print transfer, and integration layers to enable subsequent integration (e.g., stop features to allow planarization after integration).

Figure 2:
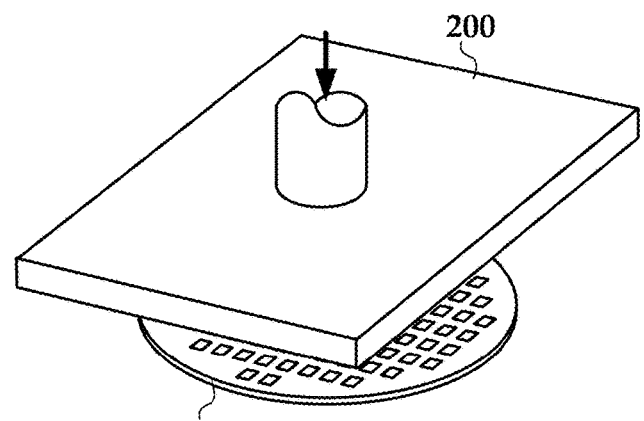
Figure 3:
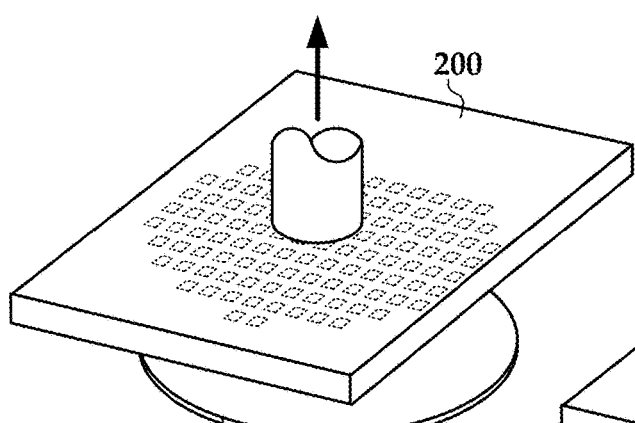

As seen in FIG. 2, a transfer print head 200 is lowered onto the substrate material (or material stack) onto a target substrate (typically of a different material). The transfer print head 200 is lifted as shown in FIG. 3, taking the components 102 with it. In this way, "islands" of the component material are then transferred to a target substrate 210 as shown in FIGS. 4-5.

Figure 4:
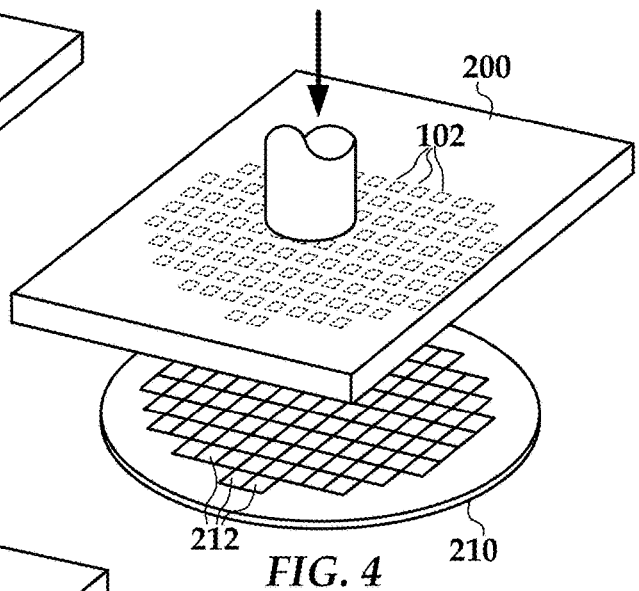
Figure 5:
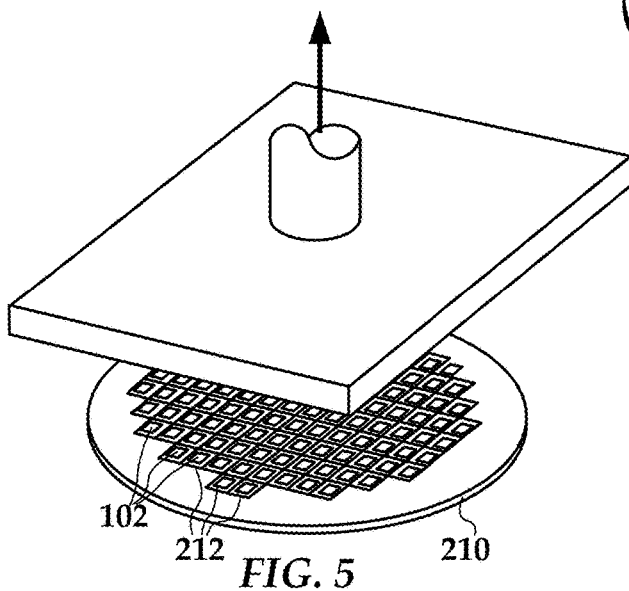

As seen in FIG. 4, the transfer print head 200 is lowered over a wafer 210 that includes a number of partially-processed recording heads 212. The transfer print head 200 presses the components 102 on to the wafer 210 and is then pulled away as seen in FIG. 5. This attaches the components 102 to the recording heads 212. Afterwards, the wafer 210 is further processed, e.g., etching the components 102 to final shape and alignment, and depositing additional layers of material to form the remaining recording head components.

Figure 6:
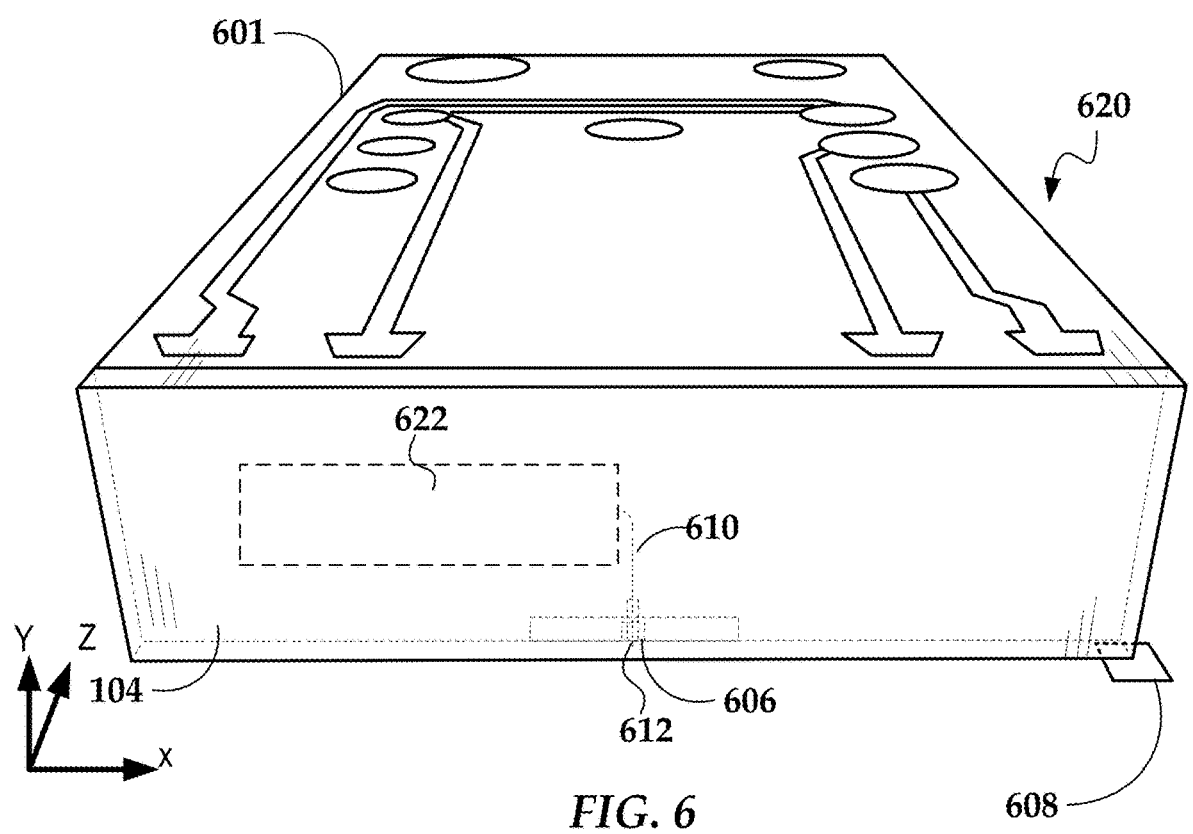
FIG. 6 is a perspective view of a slider having an On-Wafer Laser (OWL) in accordance with embodiments described herein.

FIG. 6 shows a perspective view of a HAMR write head 620 in accordance with embodiments described herein. As described above, at least part of the laser diode 622 is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. The laser diode 622 delivers light to a region proximate a HAMR read/write transducer 606, which is located near the media-facing surface 608. The media-facing surface 608 faces and is held proximate to the moving media surface while reading and writing to the media. The media-facing surface 108 may be configured as an air-bearing surface (ABS) that maintains separation from the media surface via a thin layer of air.

The energy is used to heat the recording media as it passes by the read/write transducer 606. Optical coupling components, such as a waveguide system 610, are formed integrally within the slider body 601 (near a trailing edge surface in this example) and function as an optical path that delivers energy from the laser diode 622 to the recording media via a near-field transducer 612. The near-field transducer 612 is located near the read/write transducer 606 and causes heating of the media during recording operations. The near-field transducer 612 may be made from plasmonic materials such as gold, silver, copper, etc.

Figure 7:
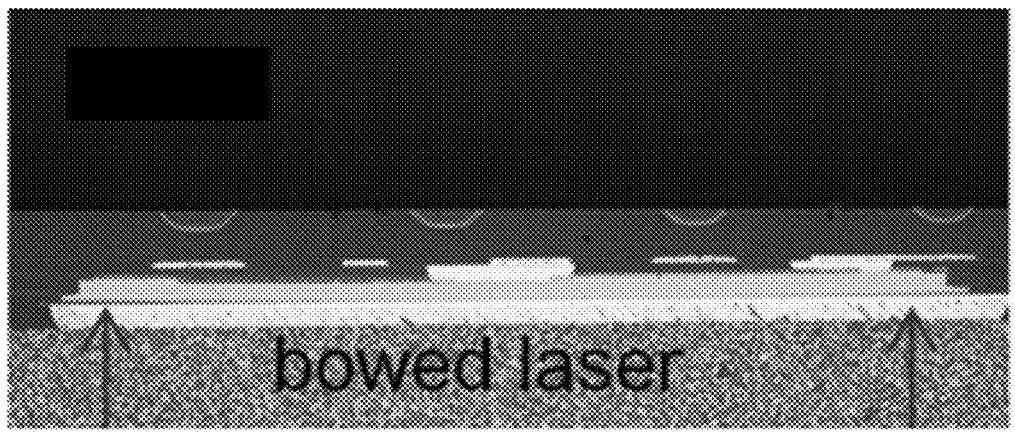
FIG. 7 shows an example of a bowed laser in accordance with embodiments described herein.

According to various embodiments described herein, deformation of lasers due to cumulative intrinsic residual, thermo-mechanical and/or external stresses of one or more layers forming the device may cause problems. FIG. 7 shows an example of a bowed laser in accordance with embodiments described herein. Deformation of the laser may cause degraded performance of the laser and/or the integrated systems with curving quantum well layers and non-parallel front and back facets. For example, the degraded performance may be due to degradation of light beam intensity, quality and/or directional control. According to various embodiments, significantly bowed lasers may fail to transfer light to the transducer wafers. Commonly used strategies used in laser manufacturing may be incompatible with the on-wafer laser technology described herein.

Sacrificial and/or additional layers either enforcing rigidity by their mechanical properties or providing compensating stress may be used, but this involves additional process content and increases the costs of manufacturing. Some technologies use stress-compensating heat-sink mechanically plastic materials t prevent deformation, but this technique may not be compatible with on-wafer technology described herein.

Embodiments described herein uses at least two independent thin film deposition methods. For example, chemical vapor deposition (CVD) either thermally or plasma enhanced, and ion beam sputter deposition (IBD), with the latter providing exceptional flexibility in choice of process conditions (temperature and/or deposition rates). Flexibility in the choice of process conditions may be useful when tailoring intrinsic stress. Other PVD techniques can be also used such as evaporative deposition (including MBE) or magnetron sputter deposition, for example. Many embodiments described herein involve using two deposition methods, but it is to be understood that any number of deposition methods may be used. According to various embodiments, both film deposition methods are integrated within one vacuum system. In some cases, the two deposition methods are not integrated. Using the two deposition methods may allow for delivery of different characteristics with respect to intrinsic stress. Using the different deposition methods allows for sufficient flexibility to simultaneously allow for both adequate optical properties and stress mitigation. Thin film intrinsic stress may be tailored by process selection, material selection or conditions, for example.

Two layers that may be used in laser design are facet anti-reflective bi-layer coating (FARC). These layers may also provide electrical insulation. These layers do not substantially increase the process content for manufacturing the laser and may be useful for integration of lasers with the on-wafer laser technology. According to various embodiments described herein, extending and/or preserving the coverage of FARC layers over at least the top part of the laser may maximize their functionality as a stress compensation instrument.

Figure 8A:
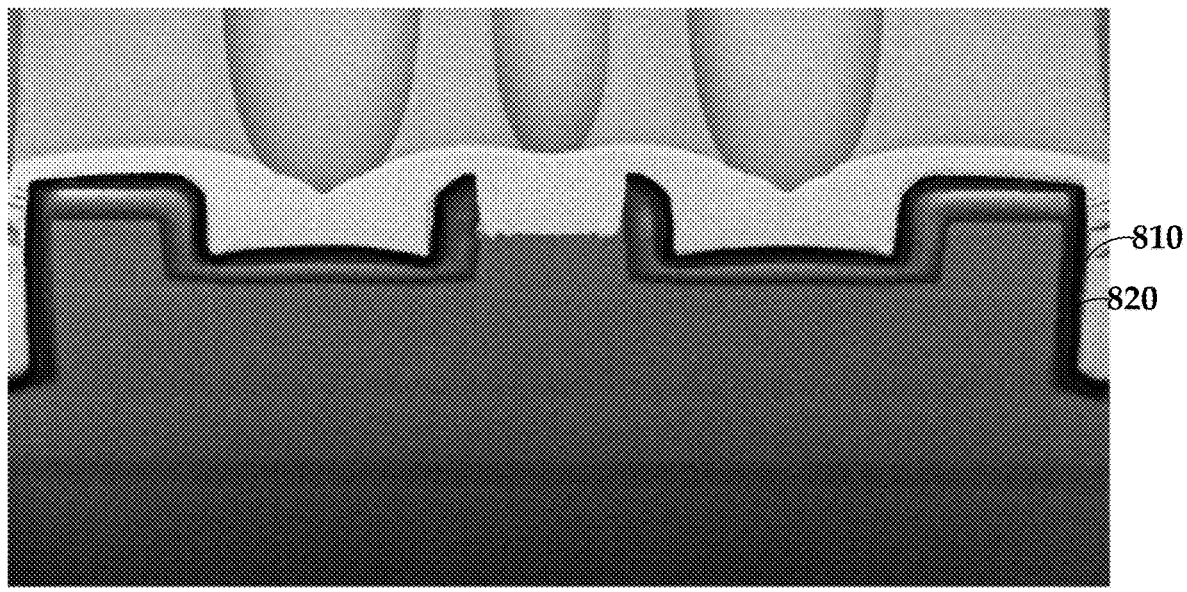
FIG. 8A illustrates facet anti-reflective bi-layer coating (FARC) layers in accordance with embodiments described herein.
Figure 8B:
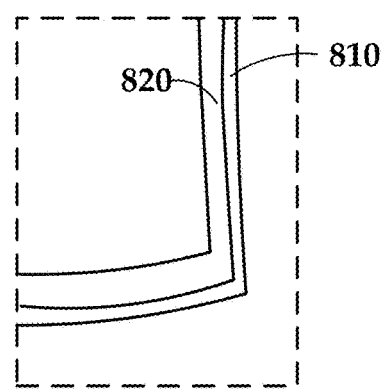
FIG. 8B shows a more detailed view of the FARC layers in accordance with embodiments described herein.

FIGS. 8A and 8B show more details of the FARC layers: $Si_3N_4$ 810 and $SiO_2$ 820 in accordance with embodiments described herein. According to various embodiments, two characteristic layers of the facet anti-reflective coating (FARC) are present in the final product internally encapsulating most of the upper part of the laser. According to various embodiments described herein, the layers provide openings for electrical contacts. In some cases, the two characteristic layers may comprise $Si_3N_4$ and $SiO_2$ where the large difference in refractive index values is requires but other combinations may include InN, $Al_2O_3$, SiON, $TiO_2$, Si, Ge, etc. In some cases, more than just two layers can be used.

According to various embodiments, the FARC layers used are transferring significant stress force to the adjacent layers and are used by design to balance the overall stresses to minimize the bowing deformation of the lasers by selecting the optimal combination of different deposition methods and process conditions. For example, IBD may be used for the deposition of $Si_3N_4$ and CVD may be used for the deposition of $SiO_2$. The deposition of $Si_3N_4$ and $SiO_2$ may be integrated within the same vacuum system to allow for added interface quality between the two layers. In a typical integration process, one or more other $Si_3N_4$ layers can be used as hard masks for definition of laser ridge and facets. Normally they are only partly consumed during etch processes and may be left in the fully integrated devices. Such residual HM layers will contribute to overall stress balance, can be utilized as compensation layers, and since their optical properties are insignificant for their performance different process conditions or deposition techniques can be used than for optically critical FARC layers.

EXAMPLE

Stress measurements of possible combinations of FARC materials and deposition methods were combined with laser build experiments and measurements of bowing effects. This may be measured by using atomic force microscopy (AFM). AFM may be used as a nanoprofiler to measure surface curvature and/or bowing in the center of the laser released from the substrate. The combination of materials and techniques described herein is based on the AFM results where the slightly compressive thicker dielectric FARC layers may compensate tensile thermal stress of thinner metal contact layers.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a substrate;
   a laser deposited above the substrate, the laser comprising one or more non-self-supporting layers of crystalline material;
   a first layer disposed proximate the laser, the first layer deposited using a first process;
   a second layer disposed proximate the first layer, the second layer deposited using a second process different than the first process, the first layer and the second layer configured to mitigate mechanical stress in the laser; and
   a waveguide deposited proximate the laser, the waveguide configured to receive plasmons from the laser and direct the plasmons to a recording medium.

2. The apparatus of claim 1 wherein the first process comprises chemical vapor deposition (CVD).

3. The apparatus of claim 1, wherein the second process comprises ion beam deposition (IBD).

4. The apparatus of claim 1, wherein the first layer comprises $SiO_2$.

5. The apparatus of claim 1, wherein the second layer comprises $Si_3N_4$.

6. The apparatus of claim 1, wherein the first process and the second process are integrated within one vacuum system.

7. The apparatus of claim 1, wherein the first layer and the second layer are configured to encapsulate a majority of an upper surface of the laser.

8. The apparatus of claim 7, further comprising openings in the first layer and the second layer to allow for electrical contacts.

9. The apparatus of claim 1, wherein materials of one or both of the first layer and the second layer are selected based on one or more of operating conditions of the laser, desired amount of stress mitigation, and desired optical properties of the laser.

10. The apparatus of claim 1, wherein one or both of the first process and the second process are selected based on one or more of operating conditions of the laser, desired amount of stress mitigation, and desired optical properties of the laser.

11. The apparatus of claim 1, wherein one or both of the first layer and the second layer are configured to provide electrical insulation.

12. An apparatus comprising:
    a substrate;
    a laser deposited above the substrate, the laser comprising one or more non-self-supporting layers of crystalline material;
    a first layer disposed proximate the laser, the first layer deposited using a first process;
    a second layer disposed on the first layer, the second layer deposited using a second process different than the first process, the first layer and the second layer configured to encapsulate a majority of an upper surface of the laser and to mitigate mechanical stress in the laser; and
    a waveguide deposited proximate the laser, the waveguide configured to receive plasmons from the laser and direct the plasmons to a recording medium.

13. The apparatus of claim 12 wherein the first process comprises chemical vapor deposition (CVD).

14. The apparatus of claim 12, wherein the second process comprises ion beam deposition (IBD).

15. The apparatus of claim 12, wherein the first layer comprises $SiO_2$.

16. The apparatus of claim 12, wherein the second layer comprises $Si_3N_4$.

17. The apparatus of claim 12, wherein the first process and the second process are integrated within one vacuum system.

18. The apparatus of claim 12, wherein one or both of the first layer and the second layer are configured to provide electrical insulation.

19. The apparatus of claim 12, further comprising openings in the first layer and the second layer to allow for electrical contacts.

20. The apparatus of claim 12, wherein materials of one or both of the first layer and the second layer and the first process and the second process are selected based on one or more of operating conditions of the laser, desired amount of stress mitigation, and desired optical properties of the laser.

* * * * *